United States Patent [19]

Miller

[11] 4,343,643

[45] Aug. 10, 1982

[54] SEALING ARTICLES INTO A GLASS ENVELOPE AND COMPOUND HOLDER THEREFOR

[75] Inventor: Elmo D. Miller, Kansas City, Mo.

[73] Assignee: Western Electric Co., Inc., New York, N.Y.

[21] Appl. No.: 222,437

[22] Filed: Jan. 5, 1981

[51] Int. Cl.[3] ...................... C03B 23/09; C03B 23/13; C03B 23/18

[52] U.S. Cl. ...................................... 65/103; 65/59.26; 65/59.28; 65/108; 65/139; 65/154; 65/155; 65/276; 65/288; 65/292; 65/374.15; 29/756; 29/759; 29/760

[58] Field of Search ..................... 65/59.26, 59.28, 138, 65/139, 154, 155, 374.11, 374.15, DIG. 12, 103, 108, 276, 288, 292; 29/746, 756, 759, 760

[56] References Cited

U.S. PATENT DOCUMENTS

| | | | |
|---|---|---|---|
| 1,885,690 | 11/1932 | Doyle | 29/756 |
| 3,268,317 | 8/1966 | Blust | 65/138 |
| 3,432,282 | 3/1969 | Schulz | 65/59 X |

OTHER PUBLICATIONS

"POCO Sealing Boats" Advertisement in *Solid State Technology*, Jun. 1980, p. 57.

*Primary Examiner*—Richard V. Fisher
*Attorney, Agent, or Firm*—W. O. Schellin

[57] ABSTRACT

A holder (55) for supporting in alignment a plurality of spaced electrodes (18) and (19) to be sealed into a corresponding plurality of envelopes (14) includes a metal base (82) which supports a stripper plate (87). A plurality of posts (36) extend from the base (82) through a plurality of seats (86) in the stripper plate. In preparation for a mass sealing operation the envelopes (14) are placed onto the seats (86) and a pair of the electrodes (18) and (19) are attached to the end of each of the posts (36). A graphite heater plate (61) having a plurality of apertures (72) is joined with the base plate (82) such that the apertures rest in concentric alignment about upper ends of the envelopes (14). An upper weight plate (92) rests on the heater plate (61) to bring weighted guide caps (46) into contact with the electrodes (18) and (19). A current is passed through the heater plate (61) to melt adjacent portions of the envelopes (14) while heat insulating properties of an upper liner (111) protect the metal base (82) and a lower metal plate of the stripper plate (87) from undesirable heat radiation from the heater plate. Both, the weight plate and the upper liner (111) are preferably made of graphite as a material to redirect radiated heat toward the heater plate (61) to increase the efficiency of the sealing operation.

8 Claims, 6 Drawing Figures

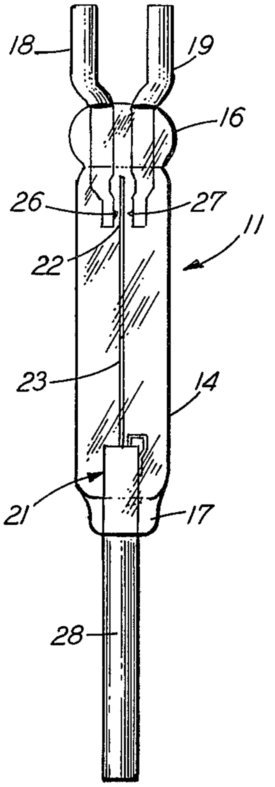
FIG.-1
(PRIOR ART)
FIG.-2
(PRIOR ART)
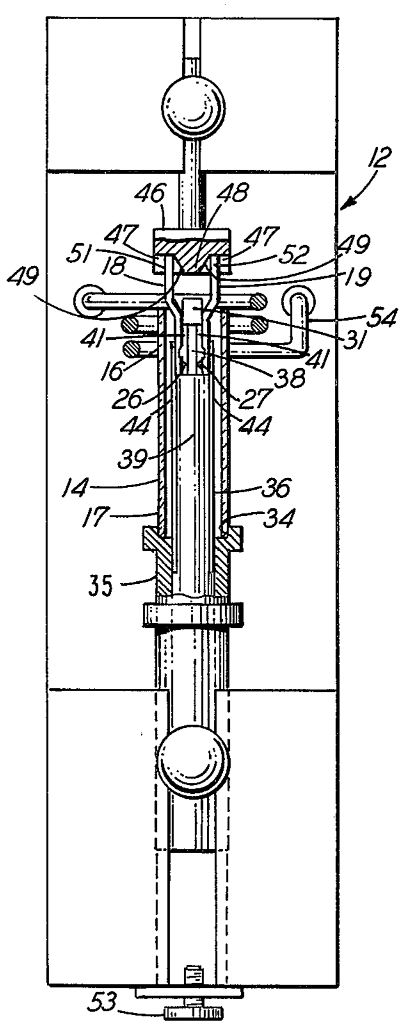

SEALING ARTICLES INTO A GLASS ENVELOPE AND COMPOUND HOLDER THEREFOR

TECHNICAL FIELD

This invention relates to sealing articles into a glass envelope and to a compound holder for supporting an array of the articles and of the envelopes during a mass sealing operation. The invention is particularly described with respect to sealing a pair of precisely spaced contacts into one end of each of a plurality of hollow cylindrical glass envelopes.

BACKGROUND OF THE INVENTION

In the manufacture of mercury wetted sealed contact switches, sealing two spaced polepieces into one end of a glass envelope has been found to be a comparatively tedious operation in that the inner ends of the polepieces have to remain precisely positioned opposite to one another after the sealing operation has been completed. Because of the stiffness of the polepieces, an adjustment of the gap after the sealing operation is impractical. The gap between the two polepieces is best set up before and maintained throughout the sealing operation. Consequently, sealing the two polepieces into the envelope has often remained a sequential, operator executed process, even though efficiency advantages of mass sealing operations have been recognized for some time.

Glass diodes, on the other hand, are typically sealed in a mass sealing process wherein the diodes are placed into a graphite holder, and the graphite holder is placed into a controlled atmosphere vessel. Within the vessel, a current is passed through the graphite holder to heat and melt the glass to complete the sealing operation. However, in the diode sealing operation, all of the glass present is typically melted to flow conveniently about the assembly of the leads and the diode chip in forming the sealed diode package. In contrast, sealing the polepieces into the end of the envelope imposes the requirement to maintain the integrity of the cylindrical envelope except for the end portion at which sealing takes place.

U.S. Pat. No. 3,432,282 to P. R. Schulz teaches a method for mass sealing dry reed contacts. The method accomplishes selective melting of both ends of the glass envelope without incurring a meltdown of the center portion of the envelope. The apparatus for accomplishing the method features several component parts. A glass tube carrier of the apparatus is water cooled to maintain portions of the tubes or envelopes in unmelted condition while contact reeds are sealed into the envelope from opposite ends thereof.

The above Schulz patent further teaches a method of adjusting such mass sealed dry reed switches. The insertion of the contact reeds from opposite ends of the envelope and the existence of a central, uncollapsed tubular envelope portion makes it possible to soften the central portion of the envelope and shift the position of the inner ends of the contact reeds with respect to each other. The switches are performance tested as the reed contacts are shifted with respect to each other to determine an optimum setting thereof.

Since a similar adjustment of the two polepieces of the mercury wetted switch with respect to each other after sealing is not practical, it is desirable to precisely position such polepieces during a process of simultaneously sealing a plurality of sets of such polepieces into a respective plurality of envelopes. It is further desirable to achieve selective melting of the envelopes at one end thereof without attaching elaborate cooling provisions to a holder used in the mass assembly of sets of two polepieces into each of the envelopes.

SUMMARY OF THE INVENTION

In accordance with the invention a holder for locating a plurality of pairs of spaced electrodes relative to an envelope during an operation for sealing the electrodes into the envelopes includes a metal support structure for accurately locating the electrodes and the envelopes with respect to each other. A graphite heater plate is mountable, appropriately spaced from the support structure. A plurality of apertures through the heater plate permit the heater plate to be mounted about the upper portions of the plurality of envelopes. Shielding plates on either side of the heater plate protect the metal support structure from becoming heated to a temperature at which the thermal expansion of the metal would affect the accuracy with which the electrodes are located relative to the envelopes.

BRIEF DESCRIPTION OF THE DRAWING

Other features of the invention and various advantages thereof will be best understood from the following detailed description of a preferred embodiment of the invention when read in reference to the accompanying drawing, wherein:

FIG. 1 is a pictorial view of a mercury wetted sealed contact switch at an intermediate stage of manufacture, as an example of a typical product, the manufacture of which is advantageously affected by the present invention;

FIG. 2 shows major components of a prior art apparatus for sealing polepieces into an envelope;

DETAILED DESCRIPTION

1. Preliminary Considerations

Figure 3:
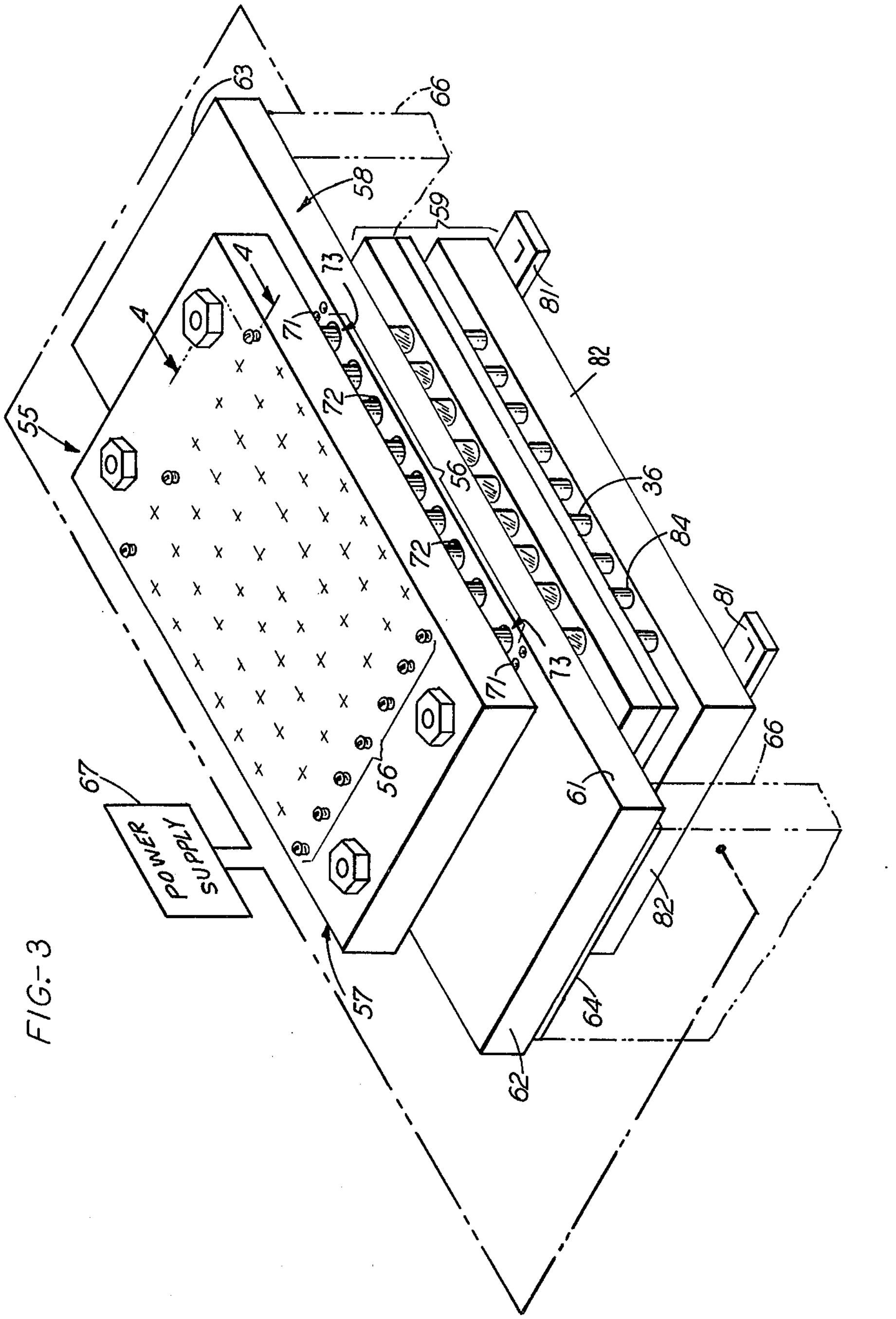
FIG. 3 is a pictorial representation of a sealing holder in accordance with the present invention.

FIG. 1 depicts a substantially completed envelope assembly designated generally by the numeral 11 which, when completed, becomes a component of a mercury-wetted sealed contact switch (not shown). The envelope assembly 11 is a typical example of an article of manufacture to which the present invention advantageously applies. Heretofore, the switches 11 preferably were assembled sequentially by manually loading them into a typical sealing apparatus 12, which is shown in FIG. 2.

The substantially completed envelope assembly 11 includes a tubular glass envelope 14 which is sealed off at ends 16 and 17. A pair of spaced electrodes or polepieces 18 and 19 are sealed into and extend through the glass wall of the envelope at the upper end 16. A stem and armature assembly 21 is sealed into and extends through the glass wall of the envelope 14 at the lower end 17, such that a free upper end 22 of an armature 23 of the assembly 21 becomes positioned between two spaced contact portions 26 and 27 of the polepieces 18 and 19, located within the envelope.

To complete the envelope assembly 11, the normally oxidizing atmosphere is evacuated from the envelope through a tubular stem 28 of the assembly 21. Mercury and an inert atmosphere are then injected into the envelope assembly 11 through the stem and the assembly is sealed by typically pinch-welding the stem 28.

In a completed switch, the precise switching time in response to a magnetic stimulus of a given magnitude depends on a precisely established spacing between the two contact portions 26 and 27. The width of the armature 23 can, as a material thickness, be precisely controlled. However, great care must be taken in sealing the polepieces 18 and 19 into the envelope to establish and maintain a precise gap width between the respective contact portions 26 and 27.

Referring to FIG. 2, the envelope 14 is first positioned as a straight cylindrical glass tube with respect to the precisely positioned polepieces 18 and 19. A filler glass chip 31 is then introduced between the polepieces 18 and 19 and the end 16 of the envelope 14 is sealed. The stem and armature assembly 21 is sealed into the other end 17 in a subsequent operation (not shown). Of particular interest to this invention, however, is the sealing of the polepieces 18 and 19 into the upper end 16 of the envelope 14.

In further reference to FIG. 2, there is shown in somewhat simplified form, the prior art apparatus 12. In the depicted apparatus 12, an annular seat 34 of a support sleeve 35 offers a surface for locating the initially cylindrical glass envelope 14. A post 36 extends centrally through the seat 34, such that when the glass envelope 14 is positioned with its lower end 17 on the seat 34, the cylindrical axis of the glass envelope coincides with a longitudinal axis of the post.

A sapphire chip 38 is mounted to an upper end 39 of the post 36, such that oppositely facing major surfaces 41 of the chip 38 extend vertically from the end 39. The thickness of the chip 38 between the major surfaces is critical to the spacing of the contact portions 26 and 27, since throughout the sealing process, the contact portions rest against such major surfaces of the sapphire chip 38. Leaf springs 44 which are permanently attached to opposite sides of the post 36 flex in a direction perpendicular to the major surfaces 41 of the chip 38 to urge the contact portions 26 and 27 against such major surfaces after the polepieces have been mounted to the end 39 of the post 36.

From above, an alignment guide 46 which has outer sloped guide surfaces 47 and a central plug 48 with downwardly inward sloping surfaces 49 is lowered onto the polepieces 18 and 19. When the guide 46 moves into contact with the polepieces 18 and 19, their outwardly extending ends 51 and 52 become aligned in a plane perpendicular to the surfaces 49. Also, the ends 51 and 52 are spread to the width of the plug 48.

A vertical screw adjustment 53 positions the contact portions 26 and 27 of the polepieces with respect to the upper end 16 and with respect to a heater coil 54 of the apparatus 12. When the heater coil 54 is energized in a routine manner by a typical, timed current source (not shown), the upper end 16 of the glass envelope 14 and the filler glass chip 31 melt to seal the polepieces 18 and 19, properly spaced, into such upper end 16 of the glass envelope 14. Thereafter, an upward movement of the sleeve 35 with respect to the post 36 strips the polepieces from the grasping hold between the springs 44 and the sapphire chip 38.

Two disadvantages of the apparatus 12 are the tediousness of its sequential operation and the need of periodic replacement of the comparatively expensive heater coil. These disadvantages are overcome by the following improvements in accordance with the present invention.

2. A Mass Sealing Apparatus

FIG. 3 depicts a mass sealing holder, designated generally by the numeral 55, as a preferred embodiment of the invention. The holder 55 is a compound structure of a plurality of spaced plates, each plate having an array 56 of features or components in vertical alignment with such an array 56 in each of the other plates.

Figure 4:
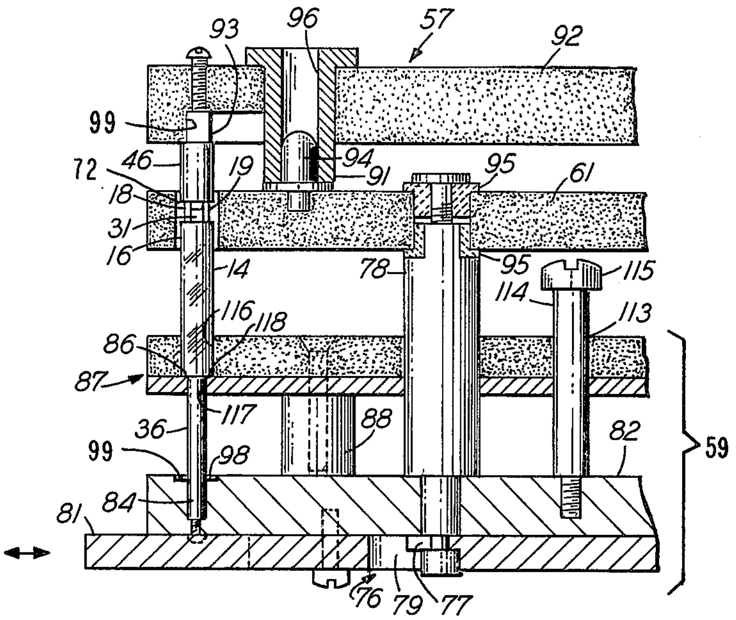
FIG. 4 is a sectional view of a portion of the holder shown in FIG. 3.

The functions of the structure of the holder 55 are best described in reference to FIGS. 3 and 4. In general, the holder 55 combines three major functional components which are in the order of their physical position, a weight plate assembly 57 shown as an uppermost plate, a heater plate assembly 58 in the upper center of the holder 55, and a base and stripper plate assembly 59 which includes the two lowermost plates of the holder 55.

The heater plate assembly 58 includes a heater plate 61 as a main component. The heater plate 61 is of a commercial graphite material which has found commercial use as a high temperature electrical resistance heating element. Like the other plates, the heater plate 61 has preferably rectangular major surfaces, but such rectangular shape is merely one of convenience and not a requirement for the practice of the invention. The heater plate 61 extends in length beyond the other plates of the holder 55 and its ends 62 and 63 have a terminal strip 64 mounted to a lower surface thereof. When the heater plate 61 is placed onto appropriately spaced supply terminals 66 of a heater circuit 67, as shown in FIG. 3, the terminal strips 64 distribute an electrical potential uniformly across the width of the heater plate 61.

Two functionally distinct groups of apertures are formed in the heater plate 61. Outer groups of apertures 71 restrict the cross-sectional area of the heater plate 61 on either side of the centered array 56 of apertures 72. Since the unit resistance at any given length of the heater plate varies with a change in its cross-sectional area, the resistance in the region of the array 56 is greater than in a region wherein the cross-sectional area of the heater plate 61 is not reduced by apertures. Consequently, outer rows 73 of the apertures 72 are typically subject to fringe cooling. By reducing the cross-sectional area of the heater plate 61 the apertures 71 effectively eliminate fringing effects of reduced heat generation in the outer rows 73 of the apertures 72.

The heater plate 61 further has a significant structural function. When the holder 55 is mounted onto the terminals 66 of a commercial heater apparatus, which are shown in phantom lines in FIG. 4, the entire holder is supported through the heater plate by the terminals 66. Thus, the weight plate assembly 57 rests on, and the base and stripperplate assembly 59 depends from, the heater plate assembly 58 such that neither the weight plate assembly nor the base and stripper plate assembly comes into contact with any other structural element of such heater apparatus.

The base and stripper plate assembly 59 is removably mounted to the heater plate assembly 58 through a quick lock and release mechanism 76. In the preferred embodiment, retainer grooves 77 at the ends of standoff posts 78 extending downward from the heater plate 61 are received by typical keyhole slots 79 in each of two slides 81. One of the slides 81 is mounted to each end of a base plate 82. The slides 81 are reasonably longer than the width of the base plate 82, such that the slides extend on one side past the vertical confines of the base plate 82 when the slides 81 are positioned for the narrow portions of the keyhole slots 79 to engage the retainer grooves 77, and the slides extend on the other side past the vertical confines of the base plate when the slides 81 are positioned to release the ends of the standoff posts 78 through the wide opening of the keyhole slots 79. Each of the extending ends 83 of the slides 81 are appropriately marked to indicate whether the slides 81 are in the lock or in the release positions.

Figure 5:
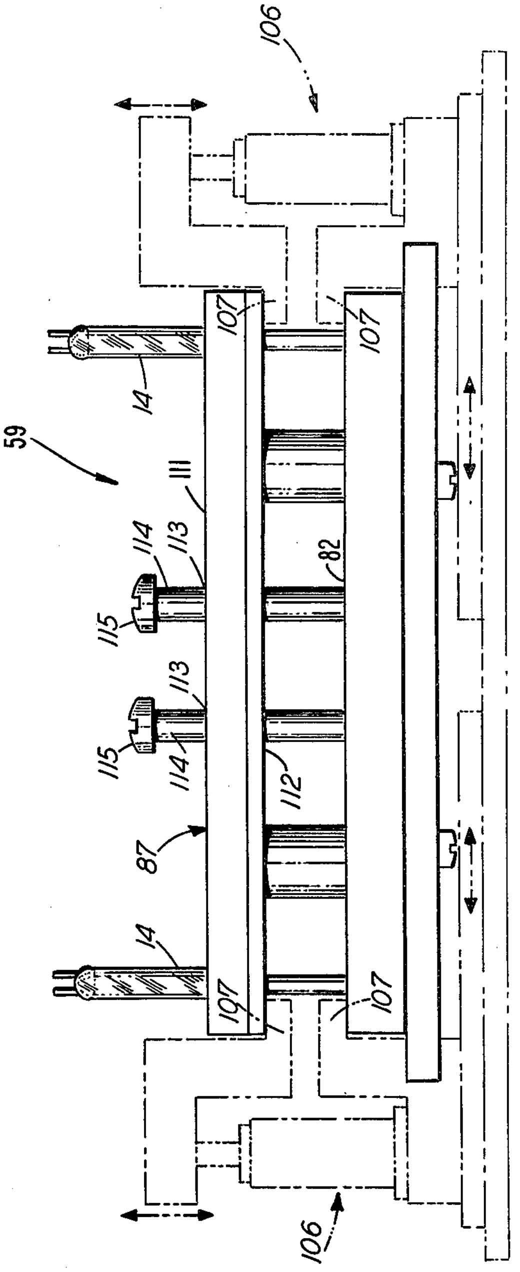
FIG. 5 is a side view of the holder of FIG. 3 in a partially disassembled state.

Further details of the base and stripper plate assembly 59 are best described in reference to FIG. 4 and to FIG. 5, wherein major components of the assembly 59 are shown separated from the heater plate assembly 58. As becomes apparent, particularly from FIG. 4, the base and stripper plate assembly 59 retains and orients with respect to each other a plurality of the glass envelopes 14, the corresponding polepieces 18 and 19 and the glass chips 31, all properly arranged in the array 56, to permit envelopes to be sealed simultaneously in a mass sealing operation.

The base plate 82 includes a plurality of counterbored apertures 84 arranged in accordance with the array 56 to mount a plurality of the prior art posts 36 in precise alignment parallel to each other. To realize the desired precision and a sufficient structural strength in the base plate 82, the material of the base plate is preferably a metal, such as brass. Brass can be readily machined and drilled to mount the posts 36 with precision. The material strength of the brass further offers a sufficiently rigid pry surface as is desirable during the unloading of the envelopes 14 after sealing. However, for the heater plate 61 to function as a resistive element, the metal base plate 82 or preferably the entire base and stripper plate assembly is electrically isolated from the heater plate 61. Such isolation is achieved by mounting the standoff posts 78 through ceramic insulator bushings 95 to the heater plate 61. Thereby, the posts 78 themselves are electrically isolated from the heater plate 61 and the metallic contact thereof with the base plate 82 will not short out the heater plate 61.

The posts 36 extend upward from the base plate 82 through annular seats 86 formed in a corresponding array 56 in a stripper plate 87. The stripper plate 87 is spaced from the base plate by a convenient dimension through spacer blocks 88. However, for a given length of the posts 36, the spacing between the stripper plate 87 and the base plate 82 is determined to locate the polepieces 18 and 19 held by the ends of the posts 36 at a proper height relative to the ends of the glass envelopes extending from the seats 86. FIG. 4 shows in an exemplary representation of one of the posts 36 and one of the seats 86 of the array 56 and illustrates in particular the vertical relationships between the envelopes 14, the polepieces 18 and 19 and the heater plate 61. The heater plate 61 encompasses the upper ends 16 of the envelopes 14.

In reference to FIGS. 3 and 4, the weight plate assembly 57 is spaced through standoff posts 91 from the heater plate 61. A plurality of the guides 46 are mounted in the array 56 in a weight plate 92 of the weight plate assembly 57. The guides 46 slide vertically in guide slots 93 to rest under their own weight on the polepieces 18 and 19, when the weight plate assembly 57 is placed onto the heater plate 61. A lateral alignment to center the array of the guides 46 on the array of the posts 36 is preferably achieved by guide pins 94 which are insulatively mounted to the heater plate 61 and which slidingly engage corresponding guide openings 96 in the standoff posts 91.

3. Loading the Sealing Holder

Components such as the envelopes 14 and the polepieces 18 and 19 are loaded into the holder 55 by placing the glass envelopes 14 onto the seats 86 while the heater plate assembly 58 is removed from the base and stripper plate assembly 59 as shown in FIG. 5. (It should be noted, however, that FIG. 5 shows the envelopes 14 with the polepieces 18 and 19 after the completion of the sealing operation.)

Placing the plurality of envelopes 14 onto the seats 86 is simplified by the posts 36 which extend beyond the seats to keep the envelopes from toppling accidentally into each other while the array 56 is being filled. After the envelopes 14 are placed on the seats 86, the polepieces 18 and 19 are attached to the respective posts 36 and the glass chips 31 are placed between each pair of the polepieces.

After the polepieces 18 and 19 are attached to the posts 36, the heater plate assembly 58 is locked onto the base and stripper plate assembly 59. Thereafter, the weight plate assembly is placed onto the heater plate 61 and the guides 46 engage and orient the upper ends of the polepieces. In the preferred embodiment, the posts 36 and the guides 46 are oriented with respect to each other and to their respective plates to cause the guides to align each pair of the polepieces 18 and 19 in a plane perpendicular to the length of the heater plate 61. Alignment pins 98 or flat surfaces on the posts 36 and on the guides 46 contact flat side surfaces of slots 99 in the weight plate and in the base plate to maintain the orientation of the posts 36 and the guides 46 with respect to each other.

4. Sealing the Envelopes

Sealing of the upper ends 16 of the envelopes 14 is accomplished in a heater chamber or vessel of a type of electrical heating apparatus which is particularly adapted for use with graphite resistance elements, such as one which is, for example, commercially available from Scientific Sealing Technology, Inc. under the Model designation D.A.P. 710. To allow the use of graphite heating elements, the heater chamber is capable of being purged of an oxidizing atmosphere, such as standard air, and being backfilled as desired with an inert atmosphere, such as argon or nitrogen, the eliminate corrosive oxidation of the graphite.

The sealing holder 55 is placed into the chamber of the apparatus with the terminals of the heater plate 61 contacting the corresponding terminals of the apparatus. The chamber is closed and after an appropriate purgation of the atmosphere in the chamber, the pressure of the inert atmosphere is raised to approximately two atmospheres, and then power is applied across the terminals to heat up the heater plate 61 to thereby melt and seal the ends of the envelopes. It appears that the increased pressure in the heater chamber advantageously prevents the envelopes 14 from collapsing about the posts 36 after sealing when the glass of the envelopes 14 is still soft and the inert atmosphere is replaced with cool gas after sealing.

It has been found that during such mass sealing step the precision in the location of the various polepieces 18 and 19 with respect to their corresponding envelopes can be maintained only by preventing the base plate 82 from heating up as a result of the radiant energy emanating from the heater plate 61.

An effective structure to shield the base plate 82 from such heat involves the use of graphite as a material for the weight plate 92 and for the stripper plate 87.

Graphite has a low coefficient of thermal expansion in comparison with brass. Also, graphite is a poor heat conductor. Thus, the outer surface of a graphite plate tends to heat quickly and re-radiate heat absorbed from the heater plate 61 toward the heater plate. Such re-radiation is believed to increase the efficiency of the heater plate 61 in melting the upper end 16 of the envelope 14. In addition, the re-radiated heat is directed away from the base plate 82 to prevent a temperature increase in the base plate into a range where thermal expansion would tend to affect the accuracy of the positions of the posts 36 relative to the envelopes 14.

In spite of the protective graphite of the weight plate 92 and the stripper plate 87, the heating cycle time is preferably minimized to avoid excessive heating of the metal components of the holder 55 by conduction through the atmosphere. This is particularly possible because of the relatively high pressure during the heating cycle. In the preferred example the glass of the envelopes 14 melts and flows at approximately 650° C. To quickly bring about the sealing of the envelopes 14, the temperature of the heater plate 61 is raised to about 1250° C. Immediately after the glass flows, the heater current is shut off and after a brief cooling period to solidify the newly formed seals, the atmosphere in the chamber is purged of the hot gases.

The total sealing cycle in accordance with a preferred technique is approximately 12 minutes. The cycle time includes loading the holder 55 into the sealing chamber, purging the chamber, heating the holder, and a cool down period prior to removing the holder 55 from the chamber. A preferred heating time to affect a seal of the polepieces 18 and 19 into the envelope 14 ranges between 3 to 5 minutes during which approximately 80 amps of current flow through the graphite of the heater plate 61. Heat in heater plate 61 is particularly generated in small cross-sectional areas. In the area of the array 56, the heater plate 61 of the preferred embodiment has a minimum cross-sectional area of approximately 2.4 $cm^2$. It has been found that as the heater plate ages, the heating time to produce a proper seal of the envelope 14 has to be extended toward the longer limit of the preferred range of 3–5 minutes. It should be understood, however, that these data are recited merely as examples of typical values which might be encountered or which might be found desirable in a similar situation. Other values may be preferred under changed circumstances.

It has also been found to be helpful to monitor the temperature of the heater plate 61 by a pyrometer of a type which includes a digital readout of the temperature of the heater plate. Such a pyrometer, which is commercially available has been found to be more effective in controlling the temperatures of the heater plate 61, than thermocouples which are traditionally used in furnaces for sealing glass diodes.

5. Unloading the Envelopes

After the sealing process is completed, the holder 55 is allowed to cool for a brief period of about 5 minutes. The holder is then removed from the heater chamber, and the weight plate assembly 57 and the heater plate assembly 58 are disengaged and removed from the base and stripper plate assembly 59 by unlocking the quick release mechanism 76.

It now becomes necessary to release or strip the glass envelopes 14 with the sealed in polepieces 18 and 19 from the base and stripper plate assembly 59. Each of the polepieces is still being held by one of the respective leaf springs 44 against the surface 41 of the sapphire chip 38. While each of the holding forces of the envelopes, measured separately, lies in the range of 250 grams, the combined holding force for retaining the array 56 of envelopes 14 on the seats 86 is sufficiently large to require in a preferred procedure a hydraulic stripping tool 106 to raise the stripper plate 87 with respect to the base plate 82. Initially, closed jaws 107 of the stripping tool 106 are consequently inserted in the space between the stripper plate 87 and the base plate 82, as shown in FIG. 5.

The stripping force is preferably applied on both sides across the narrow width of the shipper plate. Nevertheless, to prevent the graphite of the stripper plate 87 from breaking, the stripper plate 87 is a compound structure of an upper plate 111 of graphite material, which is supported by a lower plate 112 of brass. It has been found that the heat insulating properties of the graphite of the upper plate 111 suffice to prevent the lower plate 112 from reaching a temperature range which would expand the metal undesirably. The brass of the lower plate 112 has sufficient strength to support the force exerted by the stripping tool 106 during the unloading of the envelopes 14. The brass of the lower plate 112 also contains guide holes 113 for guide posts 114. The guide posts 114 carry a head 115 which provides a travel limit for the upward travel of the stripper plate 87.

The compound structure of the stripper plate 87 has proved advantageous in forming the seats 86 with precision. To form each seat 86, (see FIG. 4) a relatively larger aperture 116 in the upper plate 111 lies concentric to a relatively smaller aperture 117 in the lower plate 112. The larger aperture 116 is of a diameter to slidingly receive and locate the envelope 14. The smaller aperture 117 is of a diameter to slidingly guide the post 36. The annular area 118 of the upper surface of the lower plate 112 provides a planar support for the lower end 17 of the envelope 14. Since all of the seats 86 in the array 56 are located off the same surface, namely the upper surface of the lower plate 112, the seats are most accurately located with respect to each other in both vertical location and in squareness with respect to the axis of the envelopes 14.

After the envelopes 14 with the sealed in polepieces have been stripped loose from the posts 36, they are carefully dumped from the base and stripper base assembly 59 or even lifted off the posts 36 individually.

6. A Handling Technique

Figure 6:
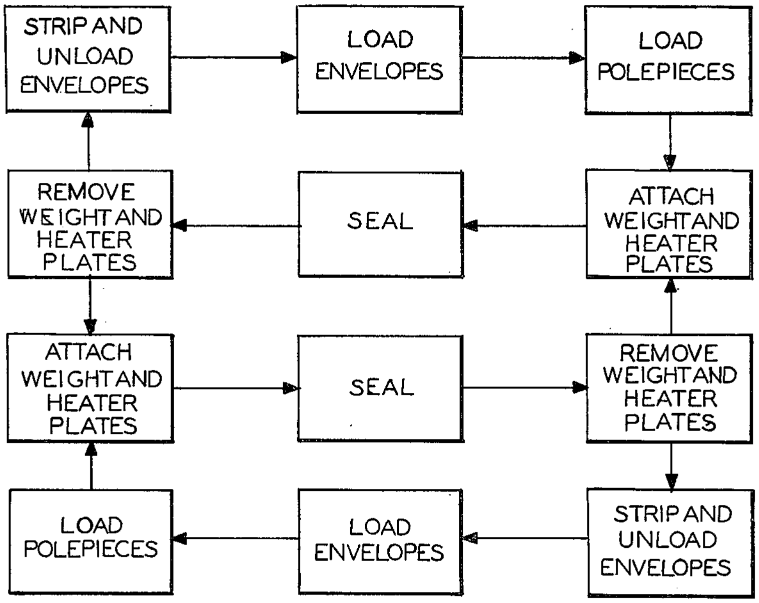
FIG. 6 is a schematic diagram of a technique for advantageously using the holder of FIG. 3.

Since the weight plate assembly 57 and the heater plate assembly 58 are removed from the base and stripper plate assembly 59 during the loading and unloading of the envelopes 14, additional efficiencies and advantages are realized in the use of the described holder in accordance with a technique illustrated in the diagram of FIG. 6.

According to a preferred handling sequence, as illustrated in FIG. 6, at least two of the base and stripper plate assemblies 59 are used in conjunction with one each of the weight plate assemblies 57 and of the heater plate assemblies 57. In a particular handling cycle of one of the base and stripper plate assemblies 59, the envelopes are placed onto the seats 86 after which the polepieces are attached to the posts 36. The base and stripper plate assemblies 59 are now ready to be combined with the heater plate assembly 58 and the weight plate assembly 57.

If at this point in the sequence a sealing operation has been completed on a second holder 55, such that the second holder is removed from the sealing chamber, certain advantages can be realized. The second holder 55 is removed and the heater plate assembly, while still hot, is transferred to the base and stripper plate assembly 59 with envelopes 14 and polepieces 18 and 19 mounted thereon. The weight plate assembly 57, preferably the one from the holder 55 which was just removed from the sealing chamber, is placed onto the heater plate assembly 58 and the newly assembled holder 55 is immediately placed into the sealing chamber. While the new sealing process is taking place in the sealing chamber, the sealed envelopes 14 are stripped from the base and stripper plate assembly 59 and unloaded. Thereafter, a new set of the envelopes 14 and the polepieces are loaded onto the assembly 59 in the described manner.

Advantages which are realized by the described sequence are significant. In essence, the component, namely the heater plate 61 which is heated to effect sealing the envelopes 14, is reused in short intervals before complete cooling takes place. Since thereby the heater plate 61 is heated to the operating temperature from a higher starting temperature, energy is saved and the overall time to complete the sealing cycle is foreshortened. In contrast, the components associated with mounting the envelopes 14 and the polepieces 18 and 19 are retained outside the sealing chamber at least during the time used for unloading and reloading the envelopes 14. During this time the base and stripper plate assembly 59 tends to cool down to approximately room temperature. To provide additional time for cooling one or more additional base and stripper plate assemblies may be inserted into the sequence, preferably between the unloading and the loading operations.

Another advantage of using a single heater plate assembly 58 with two or more base and stripper plate assemblies 59 relates to the sealing process control. The time for sealing the ends 16 of the envelopes 14 depends, as described, on several variables of which the resistance of the heater plate 61 is one. The resistance between any two heater plates 61 is likely to vary to some extent. Consequently, the controls of the sealing apparatus are most accurately adjusted and maintained when the apparatus can be operated with a single heater plate 61. As the resistance slowly changes over the useful life of the heater plate 61, small adjustments in the cycle time or the amount of current flow may be made. However, the overall process result has been found to remain most uniform, when only a single heater plate is used.

FIG. 6 shows the sequence of sealing the envelopes 14 with only a single heater plate 61. It should be realized, however, that more than two base and stripper plate assemblies 59 can be used and preferably about five of the assemblies 59 are used for an increased time allocation for loading the envelopes. Also, whether the weight plate assembly 57 is reused together with the same base and stripper plate assembly 59 or whether the weight plate assemblies are recycled in the same or similar order as the base and stripper plate assemblies, does not appear to result in any significant differences in process results.

It must be realized that in view of the above detailed description, various additional changes and modifications to the described embodiments are possible without departing from the spirit and scope of this invention.

What is claimed is:

1. A holder for positioning a plurality of envelopes relative to a plurality of electrodes during a heat sealing operation, which comprises:

a base including a plurality of extensions mounted in a precise array;

a stripper plate mounted adjacent to the base, said stripper plate including a plurality of openings arranged in said array with the stripper plate having an alignment relative to said base, such that said extensions of said base extend through said openings in the stripper plate, the stripper plate having a seat for one of said envelopes formed about each of the openings, each of the extensions having at least one reference surface for mounting at least one of said electrodes in reference thereto, whereby said at least one electrode becomes positioned relative to said envelope positioned on said seat;

a heater plate being releasably mounted relative to said stripper plate adjacent ends of said envelopes for heating said envelopes and said electrodes thereby forming a seal between said ends of said envelopes and said electrodes; and a heat shield positioned between said base and said heater plate for protecting said base from heat radiated from said heater plate during the heat sealing operation.

2. A holder according to claim 1, wherein the base is a metal base and the stripper plate is a compound structure of a metal plate adjacent to the base and the heat shield mounted between said metal plate of the stripper plate and the heater plate.

3. A holder according to claim 2, wherein the heater plate is of graphite, said heater plate including a plurality of apertures, said apertures being located in said array, each one of said apertures encompassing one of such ends of said envelopes for directing heat from the plate to said end for the heat sealing operation.

4. A holder according to claim 3, said holder further comprising a weight plate mounted adjacent to said heater plate, said weight plate including a plurality of guides slidably extending from the weight plate toward the heater plate to engage and guide ends of said electrodes extending from said extensions from said base.

5. A holder for heat-sealing one end of a plurality of cylinders about a respective plurality of spaced pairs of electrodes, which comprises:

a first plate having an array of annular seats for the cylinders formed in an upper major surface of such plate, each seat having a concentric aperture extending through said first plate, said first plate including an upper layer of graphite and a lower layer of metal;

a second plate located below said first plate and restricted from lateral movement with respect to said first plate, said plate having a plurality of posts mounted in said array to an upper surface of said second plate, said posts extending through said apertures concentric with said seats and having means for mounting a pair of said electrodes at an upper end thereof; and a heater plate, adapted to be removably mounted at a predetermined distance above said first plate, said heater plate being of a resistive material and having a plurality of apertures arranged in said array, said apertures being sized to encompass upper ends of said cylinders, said apertures also restricting the cross-sectional area of said heater plate, said heater plate further having a terminal at each end thereof, such terminals being adapted to be coupled across an electrical current source for urging a current through said heater plate to seal said ends of said cylinders.

6. A holder according to claim 5, which further comprises:

a weight plate removably mountable at a distance above said heater plate, said weight plate being of a material having heat insulative characteristics and heat reflective properties for redirecting radiated heat from said heater plate back to said heater plate.

7. A holder according to claim 6, wherein a plurality of weighted guides are mounted in said array of said weight plate to depend from said weight plate toward said apertures in said heater plate when said weight plate is mounted at said distance above said heater plate, each of said guides being vertically sslidable in said weight plate independently of each other to separately engage each of said pair of electrodes with a predetermined force.

8. An improved method of sealing, in each of a number of successive cycles, ends of a plurality of cylindrical articles, which involves at least two plate assemblies, each such plate assembly adapted to hold a plurality of said articles wherein, after an initial startup cycle, the method comprises:

loading one plurality of said articles onto a first plate assembly having a plurality of seats arranged in an array on said first plate assembly; removing a previously heated heater plate from a previously loaded, second plate assembly, said heater plate and said second plate assembly being at a temperature higher than the temperature of said first plate assembly;

removably mounting said removed heater plate to said first plate assembly to position a heating zone of said heater plate about each of said ends of said articles loaded onto said first plate assembly;

placing said first plate assembly and said heater plate into a sealing chamber;

heating said heater plate within said sealing chamber to seal the ends of said one plurality of said articles;

unloading a previously heated plurality of said articles from said second plate assembly; and allowing said second plate assembly to cool down from said temperature higher than the temperature of the first plate assembly upon removal of the heater plate from the second plate assembly before loading in a subsequent cycle a subsequent plurality of said articles onto such second plate assembly prior to removably mounting said removed heater plate to such second plate assembly and heating the heater plate in such subsequent cycle to seal the ends of such subsequent plurality of the articles.

* * * * *